Sept. 14, 1965 G. R. BRIGGS 3,206,342

METHODS OF MAKING A SHEET ARRAY OF MAGNETIC METAL ELEMENTS

Filed Aug. 31, 1961

INVENTOR.
GEORGE R. BRIGGS
BY
ATTORNEY

United States Patent Office 3,206,342

Patented Sept. 14, 1965

3,206,342

METHODS OF MAKING A SHEET ARRAY OF MAGNETIC METAL ELEMENTS

George R. Briggs, Princeton, N.J., assignor to Radio Corporation of America, a corporation of Delaware Filed Aug. 31, 1961, Ser. No. 135,217
7 Claims. (Cl. 156—11)

This invention relates to methods of making a sheet array of magnetic metal elements such as memory elements. The methods of the invention are particularly useful in making a permalloy metal sheet array of flux logic memory elements provided with electrical windings for use in high-speed random access memory units of electronic data processing or computer equipment. The term "memory element" as used herein means an element useful in the performance of the memory function and other information handling functions.

The present invention is exemplified in connection with so-called magnetic metal sheet memory arrays of the type described in my prior patent applications: Serial No. 61,438, filed October 10, 1960, Serial No. 92,263, filed February 28, 1961, and Serial No. 92,264, filed February 28, 1961. The described magnetic metal sheet memory arrays consist of an annealed molybdenum permalloy sheet having a thickness in the range of about ⅛ mil to 1 mil, the sheet being photo-etched to form an array of annulus memory elements or multiple-apertured transfluxor-type flux logic memory elements which are magnetically separated from each other and from the framing or remaining portion of the metal sheet. The sheet is provided with an insulating coating on which windings extending through the apertures are printed. The windings can be arranged for operation of the memory elements in either the so-called "word organized" or the "coincident current" method of selection. Each memory element for storing a "bit" of information may have dimensions of about 0.02 x 0.04 x 0.005 inch, so that it is possible to construct a memory having 250,000 memory elements per cubic inch. A memory element can be switched in a time within the range of about 20 manoseconds to 10 microseconds. The metal sheet memory array is capable of operation over an ambient temperature range of about −100° C. to +200° C.

In the construction of a metal sheet memory array it is important that the magnetic and electrical properties of the individual memory elements be highly uniform. In order to achieve the uniform characteristics, it is highly desirable that the individual memory elements be nearly identical in physical dimensions, and that the individual elements be free of non-uniform mechanical stresses which cause variations in the magnetic properties of the elements. Stresses can be communicated to the memory elements from the surrounding metal sheet from which the memory elements are etched, from the coatings applied to the metal sheet in constructing the metal sheet memory array, and from the conductive windings printed on the coatings.

It is therefore a general object of this invention to provide improved methods of constructing a sheet array of magnetic metal elements, such as metal memory elements, so that the resulting individual elements are substantially uniform in operating characteristics.

It is another object to provide improved methods of constructing a sheet array of magnetic metal elements wherein the individual memory elements are dimensionally uniform and are free of disturbing mechanical stresses.

It is a further object to provide an improved method of constructing large numbers of uniform magnetic metal elements of very small size by automation techniques.

In accordance with an example of the invention, a sheet of magnetic metal such as molybdenum permalloy is provided with a layer of etch resistant material on both sides of the sheet in a pattern permitting the etching of apertures from both sides of the metal sheet, and permitting the etching from one side only of the sheet of gaps which surround groups of apertures and which define individual memory elements. The sheet is electro-etched by connecting one terminal of an electric current source to a marginal portion of the metal sheet and immersing the sheet in an electrolyte in which the other terminal of the current source is also immersed. The electro-etching is permitted to continue at least until all of the gaps are etched through. When each gap surrounding the particular memory element is etched through, the metal memory element is automatically disconnected from the electrical etching circuit. Therefore, all the memory elements are etched to uniform dimensions even though the etching of some elements is completed prior to that of others. The etch resistant material on one side of the sheet bridges the gaps and holds the memory elements in position relative to each other and relative to the remaining or framing portion of the sheet.

The next step in the method is to apply a coating of high-temperature, resilient, electrical insulating material such as silicone rubber to both sides of the etched sheet including the walls of the apertures. The assembly is then heated to a temperature which is sufficiently high to at least partially decompose and thereby mechanically deteriorate the layer of etch resistant material but not so high as to affect the insulating coating, whereby the mechanical stress otherwise imparted by the layer of etch resistant material to the memory elements is relieved. The insulating coating then assumes the function of holding the individual memory elements in place.

A layer of thermoplastic material such as vinyl acetate or vinyl alcohol is then applied over the insulating coating, and electrically conductive windings are deposited on the thermoplastic layer. Then the assembly is heated to a temperature which at least softens the thermoplastic layer and permits the thermoplastic layer to accommodate itself to the strained configuration of the printed windings and relieves the stresses that would otherwise be transmitted from the windings to the magnetic metal memory elements. An alternative procedure involves the use of a silicone grease layer on the insulating coating and a plastic layer over the grease to provide a stress relieving cushion under the windings.

Figures 1, 2, 3, 4, 5, 6, 7:
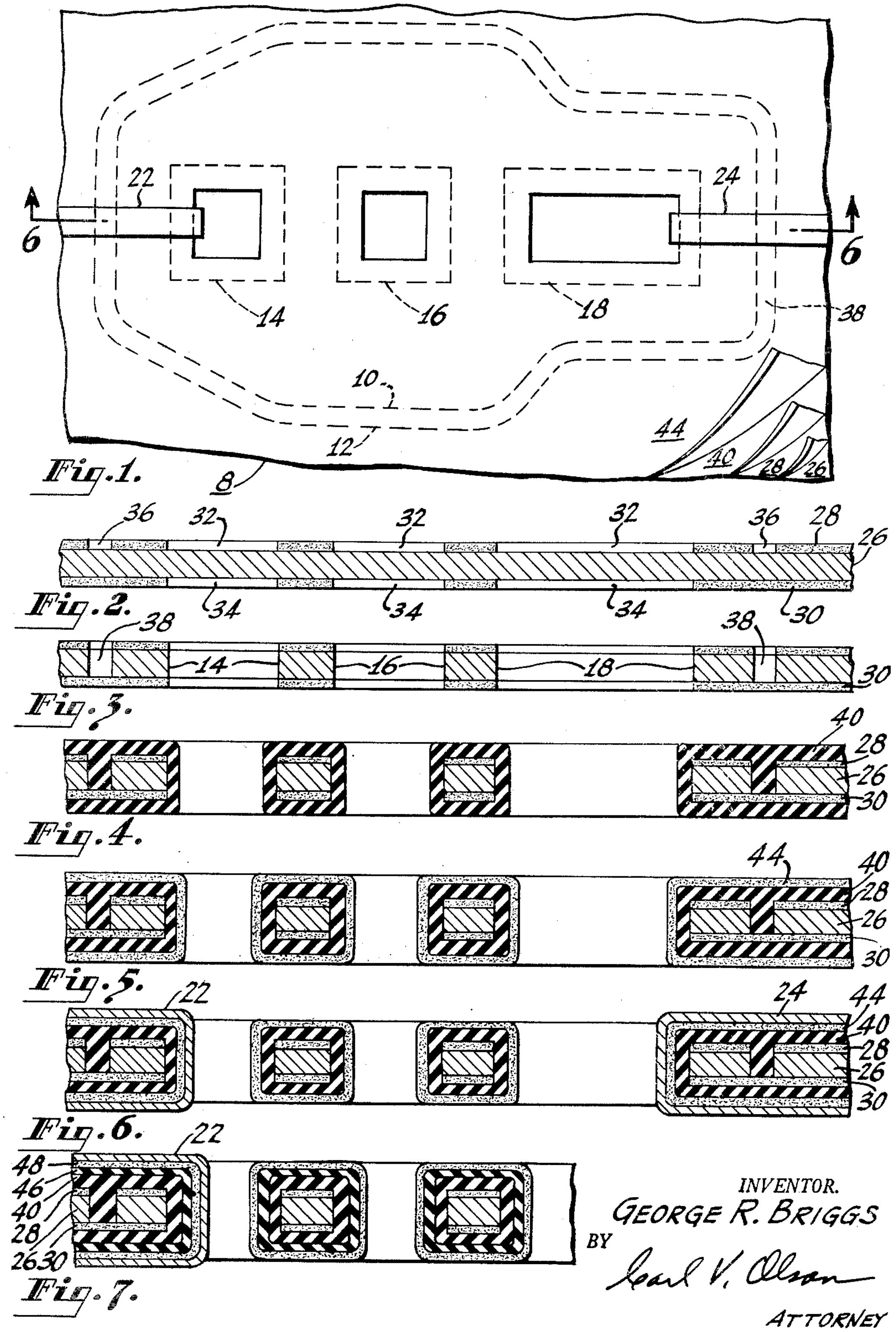
FIGURE 1 is a plan view of a fragmentary portion of a metal sheet memory array showing one of a large number of flux logic memory elements.
FIGURES 2 through 6 are sectional views taken along the line 6—6 in FIGURE 1 showing the assembly at progressive stages or steps in the method of constructing a metal sheet memory array according to the invention.
FIGURE 7 is a sectional view illustrating the final assembly resulting from certain alternative steps in the method.

FIGURE 1 shows, in plan view, a fragmentary portion 8 of a metal sheet memory array, the portion including one (of many) flux logic memory elements. The dotted line 10 is the outline of a magnetic metal flux logic memory element etched from the surrounding or framing magnetic metal sheet 26, which extends to the dotted line 12. The space between the dotted lines 10 and 12 is a gap etched through the magnetic metal sheet. The dotted line rectangles 14, 16 and 18 are the walls of three apertures etched through the magnetic metal sheet. Both the top and bottom sides of the etched magnetic sheet, and the walls of the apertures, are coated with various layers of material, as will be described, and printed windings 22 and 24 are deposited on the layers in a manner extending through the apertures 14 and 18, respectively. The windings 22 and 24 are merely illustrative of a larger number of windings which are normally required and employed in the operation of a flux logic memory element.

The method of constructing a magnetic metal sheet memory array will now be described with references to the fragmentary sectional views of FIGURES 2 through 6. The process starts with a sheet 26 of magnetic metal such as annealed molybdenum permalloy which may have a thickness of between ⅛ mil (i.e., milliinch) and 1 mil. The suitable magnetic metal sheet is a sheet known in the trade as "HYMU-80." The metal sheet 26 is covered on both sides with a layer of photoformed resinous, plastic, etch resistant material 28 and 30 in a pattern leaving the metal sheet 26 exposed on both sides at 32 and 34 where apertures are desired, and leaving the metal exposed on one side only at 36 where the etching of a gap is desired. The etch resistant layers 28 and 30 may be a photoresist material such as is known in the trade as "KPR," sold by Eastman Kodak Company. The photoresist material may consist of light-sensitive film-forming polyesters derived from 2-propenylidene malonic compounds and bifunctional glycols containing 2 to 12 carbon atoms. This material is more fully described in U.S. Patent No. 2,956,878 issued on October 18, 1960, to M. S. Michiels, et al. The pattern of the etch resistant layer is established by exposing an original continuous photoresist layer to light in the pattern of the apertures and gaps, and chemically removing the exposed photoresist to provide the result illustrated in FIGURE 2 of the drawing.

The assembly illustrated in FIGURE 2 is electro-etched to form the apertures 14, 16 and 18, and the gap 38, as illustrated in FIGURE 3. The electro-etching is accomplished by connecting the positive terminal of an electric current source to a marginal portion of the metal sheet 26 and immersing the sheet in an electrolyte in which the negative terminal of the current source is also immersed. The electrolyte may be a 40 percent solution of sulphuric acid. The etching of the metal is allowed to continue until all of the gaps 38 on the sheet are completely etched through. The various gaps 38 on the metal sheet are normally etched through from the top side of the sheet at different times, depending on the geometry of the current paths in the electrolyte. The etching of the apertures 14, 16 and 18 progresses at a faster rate because the etching occurs from both sides of the metal sheet. When the gap 38 surrounding the apertures is etched through, the further etching of the walls of the apertures ceases because the portion of the magnetic sheet within the gap 38 is then removed from the electrical etching circuit. Therefore, to the extent that the photoresist patterns are uniform, the physical dimensions of each magnetic memory element are the same as the dimensions of every other element. This is because the etching of the boundaries and apertures of memory elements continues only for the definite time duration required to etch through the associated gap 38. Further etching may enlarge the gap 38 by removing material from the framing or surrounding material but it does not change the dimensions of the memory element itself. The dimensions of the framing magnetic metal do not affect the magnetic and electrical quantities of the separated individual magnetic memory elements.

The etching process results in the formation of a large number of memory elements each defined or bounded by a gap 38, the memory elements being maintained in position relative to each other and relative to the remaining or framing portion of the magnetic metal sheet by the etch resistant material 30 on the lower side of the sheet which bridges the gaps 38.

The assembly of FIGURE 3 is provided with a coating 40, as shown in FIGURE 4, of a high-temperature, resilient, resinous electrical insulating material on both sides of the sheet including the walls of the apertures. The high-temperature, resilient, insulating coating may be silicone rubber, which is applied in liquid form and cured or vulcanized, or it may be another material of similar mechanical and electrical qualities such as polyurethane, or certain modified epoxy resins, polyesters or thermoplastics. The insulating coating may have a thickness in the range of about 0.5 to 1.0 mil.

The silicone rubber coated assembly illustrated in FIGURE 4 is heated to a temperature of approximately 325° C. for a period of about from 2 to 5 minutes. An air-bake oven is satisfactory. The temperature to which the assembly of FIGURE 4 is subjected is selected to be not so high as to undesirably affect the insulating coating 40, but to be high enough to cause a mechanical deterioration or partial decomposition or charring of the etch resistant layers 28 and 30. The mechanical deterioration or charring of the etch resistant layers relieves the mechanical stress that the etch resistant material otherwise applies to the magnetic metal 26 of the memory elements. The stress which is relieved is a stress inherently established during the drying of the etch resistant layer after it is applied in liquid form to the metal sheet by spraying or dipping. The function of holding the separate memory elements in position, previously performed by the etch resistant layer 30 on the bottom of the sheet, is now performed by the resilient coating 40 which bridges the gaps 38 at both the top and bottom surfaces of the magnetic metal sheet 26. The mechanical deterioration or charring of the etch resistant layer 30 also relieves any stress that might otherwise be transmitted to a memory element from the surrounding or framing portion of the metal sheet. The silicone rubber coating 40 is sufficiently resilient to transmit substantially no mechanical stress from the framing metal to the individual memory elements.

The assembly illustrated in FIGURE 4 is provided, as shown in FIGURE 5, with a layer 44 of thermoplastic material on both sides of the coated sheet and on the walls of the apertures. The thermoplastic material 44 may be vinyl acetate, vinyl alcohol, polyester resin or other material having a melting or softening temperature below the temperaturee of about 380° C. at which the silicone rubber coating deteriorates, and having the property of adhering to the silicone rubber coating. The thermoplastic layer 44 may have a thickness in the range of about 0.1 to 0.2 mil.

The thermoplastic layer 44 serves two functions. First, the thermoplastic layer is employed as a foundation upon which printed windings will adhere, the foundation being needed because printed windings do not adhere well to the silicone rubber coating 40. Second, the thermoplastic layer 44 is employed to relieve stresses that otherwise would be imparted from the printed windings 22, 24 through the silicone rubber coating 40 to the magnetic metal elements.

FIGURE 6 illustrates the result of the final step of printing or depositing conductive windings 22 and 24 on the thermoplastic layer 44. The printed windings 22 and 24 may be formed by any well-known printed circuit technique. The forming of printed windings normally involves the establishment of certain mechanical stresses in the printed windings, and the stresses may be transmitted through the intervening layers of material to the magnetic metal memory elements. The stresses in the windings are prevented from being transmitted to the metal memory elements by the final step of heating the assembly to a temperature sufficient to melt or soften the thermoplastic layer 44. When the thermoplastic material is vinyl acetate, the assembly may be heating to a temperature in the range of about 150° C. to 200° C. for a short time. The heat causes a softening of the thermoplastic layer 44 which permits the printed windings 22 and 24 to move to strained but stress-relieved positions. Upon cooling, the thermoplastic material 44 hardens and provides a firm support for the strained printed windings. The deformation of the printed windings due to its internal stresses is accommodated by the thermoplastic layer 44 so that the stresses are not transmitted through the silicone rubber coating 40 to the magnetic memory elements.

FIGURE 7 shows the results of alternative steps in the method. A silicone grease is dissolved in a solvent and sprayed on the silicone rubber coating 40 of FIGURE 4. The silicone rubber grease may be one known in the trade as type SS–4458, sold by the General Electric Company, and the grease layer 46 after drying may have a thickness in the range of between 0.1 and 0.2 mil. A thin flexible plastic layer 48 is then sprayed over the silicone grease layer 46 to form an encasing plastic bag about the grease. Thereafter, the winding conductors are printed on the plastic layer 48 by any suitable method. The stresses which are established in the winding conductors 22, 24 when they are formed result in a deformation of the windings which is permitted by the easily deformable silicone grease and the encasing plastic layer. The winding stresses are not communicated to the metal memory elements. The grease, being always viscous, accommodates strains of the windings, even the strains which may arise due to temperature changes during the course of the actual use of the memory array in an operating memory system.

It is thus apparent that according to the teachings of this invention there are provided improved methods for constructing a sheet array of magnetic metal elements wherein the elements are of uniform physical dimensions and are free of mechanical stresses that would otherwise decrease the uniformity of their magnetic and electrical operating characteristics.

What is claimed is:

1. In the method of producing a sheet array of memory elements, the steps of applying a layer of a resinous etch resistant material on both sides of a sheet of magnetic metal in a pattern permitting the etching of apertures from both sides of the sheet and permitting the etching from one side of the sheet of gaps surrounding at least one aperture and defining memory elements, etching apertures and gaps in said sheet so that magnetic memory elements are formed which are separate from each other and from the sheet but are held in place by said etch resistant material, applying a coating of a resinous resilient material to both sides of said etched sheet and the etch resistant material thereon and to the walls of said apertures, said resilient material being mechanically stable at temperatures at and above those at which said etch resistant material deteriorates, and heating said coated sheet to a temperature sufficient to partially decompose said etch resisant material, but not sufficient to affect the resilient coating, to cause the mechanical stress otherwise imparted by said etch resistant material to said memory elements to be relieved.

2. In the method of producing a sheet array of flux logic memory elements, the steps of applying a layer of a resinous etch resistant material on both sides of a sheet of magnetic metal in a pattern permitting the etching from both sides of the sheet of apertures and permitting the etching from one side of the sheet of gaps surrounding groups of apertures and defining memory elements, electro-etching apertures and gaps in said sheet, applying a coating of high-temperature resilient electrical insulating resinous silicone rubber material to both sides of said etched sheet and the etch resistant material thereon and to the walls of said apertures, said silicone rubber material being mechanically stable at temperatures at and above those at which said etch resistant material deteriorates, and heating said coated sheet to a temperature sufficient to partially decompose said etch resistant material, but not sufficient to affect the insulting coating, to cause the mechanical stress otherwise imparted by said etch resistant material to said memory elements to be relieved.

3. In the method of producing a sheet array of flux logic memory elements, the steps of applying a light-sensitive film-forming resinous polyester photoresist material on both sides of a sheet of magnetic metal in a pattern permitting the etching from both sides of the sheet of apertures and permitting the etching from one side of the sheet of gaps surrounding groups of apertures and defining memory elements, said photoresist material being mechanically unstable at 325 degrees centrigrade, electro-etching apertures and gaps in said sheet, applying a coating of resinous silicone rubber to both sides of said etched sheet and the photoresist thereon and to the walls of said apertures, said silicone rubber being mechanically stable at temperatures at which said photoresist material deterioratees, and heating said coated sheet to a temperature of about 325 degrees centrigrade for a few minutes to partially decompose said etch resistant material.

4. In the method of producing a sheet array of magnetic memory elements, the steps of applying a layer of a resinous etch resistant material on a sheet of magnetic metal in a pattern defining memory elements, etching said sheet, applying a coating of resinous resilient material on said etched sheet, and over said etch resistant material, said resilient material being mechanically stable at temperatures at and above those at which said etch resistant material deteriorates, heating said coated sheet to a temperature sufficient to partially decompose said etch resistant material, but not sufficient to affect the resilient coating, and to cause the mechanical stress otherwise imparted by said etch resistant material to said memory elements to be relieved, applying a layer of thermoplastic material over said resilient coating, printing windings on said thermoplastic layer, and heating the assembly to a temperature sufficient to at least soften the thermoplastic layer and cause the thermoplastic layer to accommodate itself to the strained configuration of the printed windings and relieve the stress otherwise transmitted to the memory elements.

5. In the method of producing a sheet array of memory elements, the steps of applying a layer of a resinous etch resistant photoresist material on both sides of a sheet of magnetic metal in a pattern permitting the etching from both sides of the sheet of apertures and permitting the etching from one side of the sheet of gaps each surrounding at least one aperture and defining a memory element, etching said sheet to form separated magnetic metal memory elements, applying a coating of high-temperature resilient electrical insulating resinous material on both sides of said etched sheet and the photoresist material thereon and on the walls of said apertures, said resilient material being mechanically stable at temperatures at and above those at which said etch resistant material deteriorates, heating said coated sheet to a temperature sufficient to partially decompose said etch resistant material, but not sufficient to affect the insulating coating, to cause the mechanical stress otherwise imparted by said etch resistant material to said memory elements to be relieved, applying a layer of thermoplastic material over said insulating coating, printing windings on said thermoplastic layer, and heating the assembly to a temperature sufficient to at least soften the thermoplastic layer and cause the thermoplastic layer to accommodate itself to the strained configuration of the printed windings and relieve the stress otherwise transmitted to the memory elements.

6. In the method of producing a sheet array of memory elements, the steps of applying a layer of a resinous etch resistant photoresist material on both sides of a sheet of magnetic metal in a pattern permitting the etching from both sides of the sheet of apertures and permitting the etching from one side of the sheet of gaps surrounding groups of apertures and defining memory elements, electro-etching said sheet to form magnetically separated memory elements, applying a coating of high-temperature resilient electrical insulating resinous silicone rubber material on both sides of said etched sheet and the photoresist material thereon and on the walls of said apertures, said silicone rubber material being mechanically stable at temperatures at and above those at which said etch resistant material deteriorates, heating said coated sheet to a temperature sufficient to partially decompose said etch resistant material but not sufficient to affect the insulating coating, to cause the mechanical stress otherwise imparted by said etch resistant material to said memory elements to be relieved, applying a layer of thermoplastic material of the group consisting of vinyl acetate and vinyl alcohol over said insulating coating, printing windings on said thermoplastic layer, and heating the assembly to at least soften the thermoplastic layer and cause the thermoplastic layer to accommodate itself to the strained configuration of the printed windings and relieve the stress otherwise transmitted to the memory elements.

7. In the method of producing a sheet array of flux logic memory elements, the steps of applying a layer of a resinous etch resistant photoresist material on both sides of a sheet of magnetic metal in a pattern permitting the etching from both sides of the sheet of apertures and permitting the etching from one side of the sheet of gaps surrounding groups of apertures and defining memory elements, electro-etching said sheet by connecting one terminal of an electrical current source to a marginal portion of said metal sheet and immersing said sheet in an electrolyte in which the other terminal of said current source is also immersed, continuing said etching at least until all of said gaps are etched through, whereby the etching of each aperture proceeds until the gap surrounding the aperture is completed, at which time the memory element is no longer in the electrical etching circuit, applying a coating of high-temperature resilient electrical insulating resinous silicone rubber material on both sides of said etched sheet and over the photoresist thereon and on the walls of said apertures, said silicone rubber material being mechanically stable at temperatures at and above those at which said etch resistant material deteriorates, heating said coated sheet to a temperature sufficient to partially decompose said etch resistant material, but not sufficient to affect the insulating coating, to cause the mechanical stress otherwise imparted by said etch resistant material to said memory elements to be relieved, applying a layer of thermoplastic material over said insulating coating, printing windings on said thermoplastic layer, and heating the assembly to a temperature sufficient to at least soften the thermoplastic layer and cause the thermoplastic layer to accommodate itself to the strained configuration of the printed windings and relieve the stress otherwise transmitted to the memory elements.

References Cited by the Examiner

UNITED STATES PATENTS

| | | | |
|---|---|---|---|
| 2,594,096 | 3/52 | Trigg | 117—230 |
| 2,693,023 | 11/54 | Kerridge et al. | 156—8 XR |
| 2,706,697 | 4/55 | Eisler. | |
| 2,858,241 | 10/58 | Seidel et al. | 117—161 |
| 2,876,393 | 3/59 | Tally et al. | |
| 2,970,296 | 1/61 | Horton | 29—155.5 |
| 3,130,134 | 4/64 | Jones | 204—15 |

FOREIGN PATENTS

| | | |
|---|---|---|
| 845,832 | 8/60 | Great Britain. |

ALEXANDER WYMAN, *Primary Examiner.*

JOSEPH REBOLD, EARL M. BERGERT, JACOB STEINBERG, *Examiners.*